United States Patent [19]

Bischoff et al.

[11] Patent Number: 5,754,596
[45] Date of Patent: May 19, 1998

[54] FIELD TRANSMITTER FOR STORING INFORMATION

[75] Inventors: Brian J. Bischoff, Chaska; Gary A. Lenz, Eden Prairie, both of Minn.

[73] Assignee: Rosemount Inc., Eden Prairie, Minn.

[21] Appl. No.: 618,330

[22] Filed: Mar. 19, 1996

Related U.S. Application Data

[63] Continuation of Ser. No. 200,626, Feb. 23, 1994.
[51] Int. Cl.$^6$ ............................. H04L 27/04; H04Q 3/00
[52] U.S. Cl. .................. 375/295; 375/377; 340/825.06; 340/825.07; 364/130
[58] Field of Search ..................... 375/295, 354, 375/377; 340/825.05, 825.06, 825.14, 825.15, 825.17, 825.02, 825.22, 825.27; 370/15, 17; 364/130, 138, 172

[56] References Cited

U.S. PATENT DOCUMENTS

| | | | |
|---|---|---|---|
| 3,633,166 | 1/1972 | Picard | 340/825.05 |
| 3,652,993 | 3/1972 | Bridwell et al. | 340/825.05 |
| 3,832,688 | 8/1974 | Strotny et al. | 340/147 |
| 3,845,472 | 10/1974 | Buchanan et al. | 340/163 |
| 4,540,890 | 9/1985 | Gangemi et al. | 307/40 |
| 4,720,780 | 1/1988 | Dolecek | 340/825.05 |
| 4,855,729 | 8/1989 | Takeuchi et al. | 340/825.05 |
| 4,907,167 | 3/1990 | Skerik | 364/500 |
| 4,939,753 | 7/1990 | Olson | 375/107 |
| 5,043,862 | 8/1991 | Takahashi et al. | 364/162 |
| 5,122,948 | 6/1992 | Zapolin | 364/131 |
| 5,283,781 | 2/1994 | Buda et al. | 348/825.05 |
| 5,287,353 | 2/1994 | Buda et al. | 340/825.06 |

FOREIGN PATENT DOCUMENTS 910315193  5/1991  Japan .

OTHER PUBLICATIONS

"SMV 3000 Smart Multivariable Transmitter: The Four-In-One Transmitter and Flow Computer", by Honeywell Inc. Nov. 1995, 6 pages.

ISA-SP-50 Subcommittee Report, "Standard Practices 50 Field Instrument Bus Standard Functional Guidelines", Jul. 7, 1986, pp. 1-13.

ISA-SP50-1986-17-C, "Instrument Society of America, Standards & Practices 50", dated Jan. 15, 1987.

ISA/SP50—1989—257, "Minutes", Instrument Society of America, Research Triangle Park, NC, Oct. 19–21, 1988.

"Messdatenerfassung in Systemen Mit Dezentraler Struktur," D. Teodorescu, *Messen Prüfen Automatisieren*, Apr. 1989, pp. 164–169.

"ACHEMA '91: Sensorsysteme Für die Betriebsmesstechnik und Kommikation im Feld," *ATP Automatisierungstechnische Praxis + Messen Steuern Regeln*, 34 (1991) Oct. No. 10, pp. 511–528.

*Primary Examiner*—Edward L. Coles, Sr.
*Assistant Examiner*—Madeleine Au Nguyen
*Attorney, Agent, or Firm*—Westman, Champlin & Kelly, P.A.

[57] ABSTRACT

A transmitter in a process control loop includes a sensor for sensing a process variable. An analog-to-digital converter coupled to the sensor provides a digitized process variable at various sample times. An interface couples the transmitter to the control loop and is used for communicating information and receiving power over the control loop. The transmitter includes a clock and a memory. A microprocessor coupled to the clock and the memory stores digitized process variables and clock information in the memory. The storage is such that the sample time of a stored digitized process variable can be determined.

14 Claims, 5 Drawing Sheets

5,754,596

1

FIELD TRANSMITTER FOR STORING INFORMATION

This is a File Wrapper Continuation of application Ser. No. 08/200,626, filed Feb. 23, 1994.

BACKGROUND OF THE INVENTION

The present invention relates to a transmitter in a process control loop. More specifically, the present invention relates to a field transmitter for storing digitized representations of process variables.

Process control loops are used to control operation of a process, as for example, in an oil refinery. A transmitter located in the field monitors a process variable, such as fluid flow, and transmits data representations of the process variable to a controller located in a control room. The controller receives signals representing process variables from numerous transmitters and is capable of controlling the process by sending signals to field instruments, such as valve positioners, to alter the process. The controller receives digital information from the transmitter at an update rate of typically once per second. Some controllers process the variables received from field transmitters and provide diagnostics indicating status of the process. For example, if a flow rate exceeds a predetermined system tolerance or alarm limits, the controller in the control room receives digital information from the field transmitters and thereafter provides a warning and can take steps to shut down the process.

There is a continuing need for improved monitoring and control of processes by field mounted process control devices.

SUMMARY OF THE INVENTION

A transmitter in a process control system coupled to a process control loop includes a sensor for sensing a process variable and circuitry for storing a digital representation of the process variable and sample time information into memory. An analog-to-digital converter coupled to the sensor provides a digitized process variable. The digitized process variable is obtained at a sample time. An interface couples the transmitter to the process control loop and communicates information over the control loop. The transmitter is powered by the same control loop used for communication. The transmitter includes a clock and a memory. Control circuitry receives the digitized process variable and clock information which it then stores in the memory. The control circuitry stores the information whereby the sample time of a stored digitized process variable is associated with the digitized process variable.

DETAILED DESCRIPTION OF THE PREFERRED EMBODIMENTS

Figure 1:
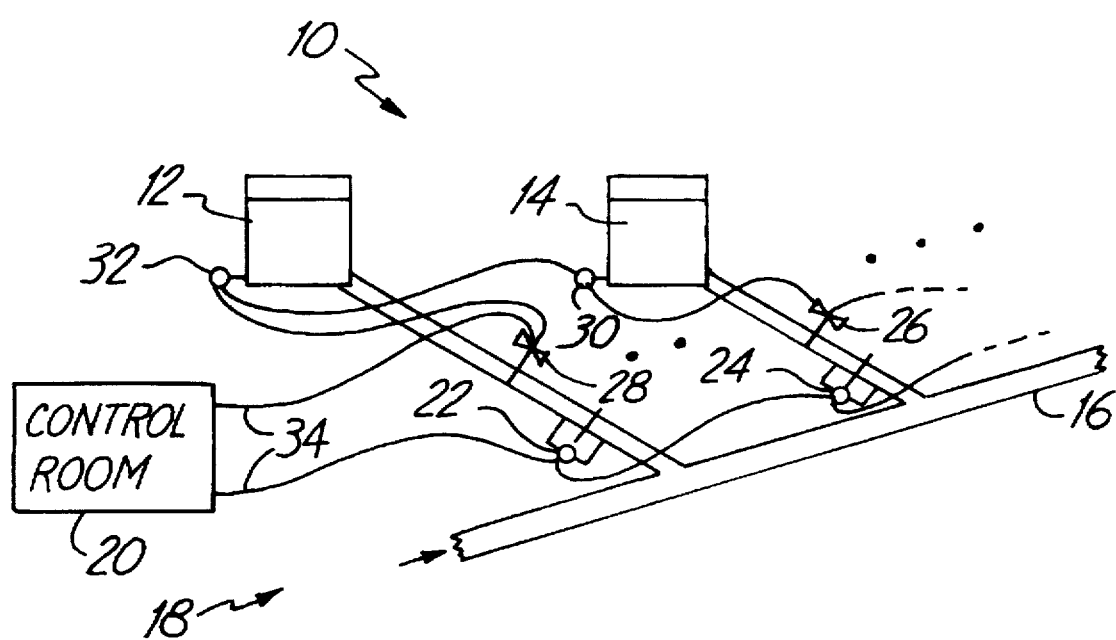
FIG. 1 is a diagram of a process control system monitoring an industrial process.

FIG. 1 is a diagram of a process control system 10 for monitoring an industrial process. The industrial process shown in FIG. 1 is a fluid storage system including storage tanks 12 and 14 and distribution piping 16. A process control system 18 includes a control room 20, flow transmitters 22 and 24, valves 26 and 28 and level sensors 30 and 32. Control room 20, transmitters 22 and 24, valves 26 and 28 and transmitters 30 and 32 are connected together on a two-wire control loop 34. Control loop 34 may comprise, for example, a number of point-to-point analog 4–20 milliamp current loops or a digital Field bus loop.

In operation, control room 20 includes a controller which monitors flow rate of fluid from pipe 16 with transmitters 22 and 24 and monitors level of fluid in tanks 12 and 14 with transmitters 30 and 32. Based upon information received from transmitters 22, 24, 30, and 32, circuitry in control room 20 adjusts valves 26 and 28 to achieve a desired process operation. It should be noted that additional valves and transmitters (field devices) and tanks may be included in system 18. Further, the transmitters and valves need not be on the same control loop.

The controller in control room 20 interrogates, for example, transmitter 22 and receives information from transmitter 22 relating to fluid flow. Due to the number of loops typically monitored, real time interrogation is typically not possible and the maximum update rate for receiving information from transmitter 22 is relatively slow, once per second for example. Circuitry in control room 20 uses this information to control operation of a process and perform diagnostics on system operation. Further, if a sensed parameter exceeds certain limits, circuitry in control room 20 recognizes a failure in the process and begins shutting down the process or performing diagnostics.

Transmitter 22 has software or a circuit which counts a clock output which is then associated with sample time of a process variable. In the software or circuit, the count can be set to a predetermined number. The speed at which the count advances must be either known or controlled. The process of "association" can comprise the steps of combining data representative of sensor output and the count of the time the sensor data is taken into a data element. The data element is then transmitted to the control room. Alternatively, the data representative of sensor output and the count when the data is taken can be stored at fixed offsets from one another in memory. They can then be combined into a data element at the time of transmission.

Figure 2:
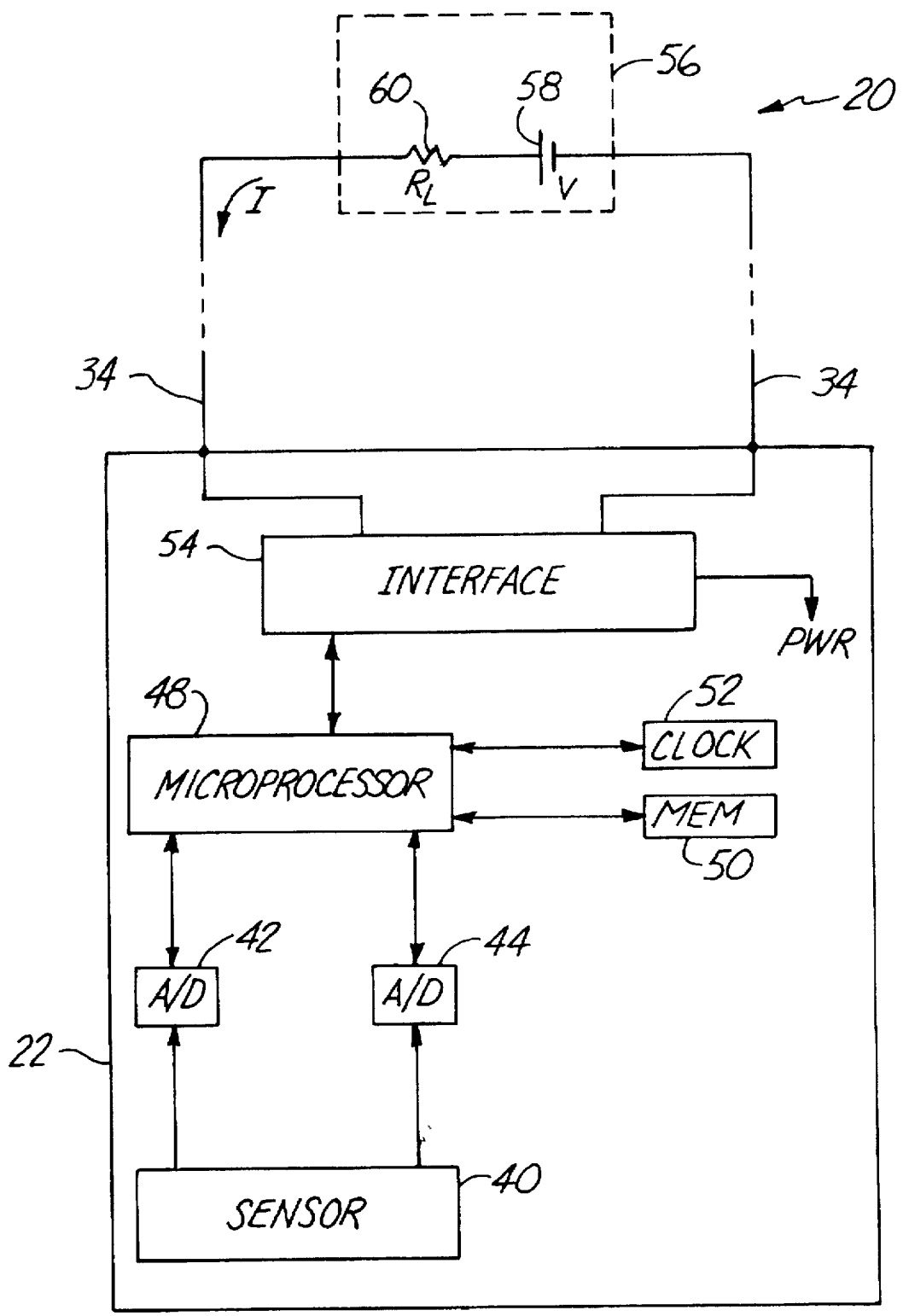
FIG. 2 is a block diagram of a transmitter in accordance with the present invention coupled to a process control loop.

FIG. 2 shows a block diagram of field transmitter 22 in accordance with the present invention. In the example, transmitter 22 measures fluid flow rate. Transmitter 22 includes flow rate sensor 40, analog-to-digital converter 42, analog-to-digital converter 44, microprocessor 48, memory 50, clock 52 and interface 54. Transmitter 22 is shown coupled to control loop 34 which connects transmitter 22 to controller 56 in control room 20. Controller 56 is modeled as a voltage source 58 and a resistor $R_L$ 60. Controller 56 causes a current I to flow through control loop 34 and transmitter 22. Microprocessor 48 functions as control circuitry for controlling operation of transmitter 20. However, other control circuitry implementations are within the scope of the invention.

In operation, sensor 40 senses a process variable (or multi-variable), in this case a differential pressure representation of the flow, Q. The PV is converted into a digital format with analog-to-digital converters 42 and 44 which provide the digitized process variable to microprocessor 48. Microprocessor 48 actuates interface 54 to transmit analog or digital information over process control loop 34 to controller 56. The information is compensated to reduce errors. In an analog transmission, the magnitude of the current I through loop 34 is representative of the sensed process variable. For example, a 4 milliamp signal can represent a minimum value of the sensed PV while a 20 milliamp signal represents a maximum value of the PV. In a digital transmission, interface 54 superimposes digital signals on the current I in control loop 34. Furthermore, controller 56 superimposes digital signals on control loop 34 which are received by interface 54 and used to control operation of microprocessor 48. These signals can be, for example, an interrogation requesting information from transmitter 22. Additional transmitters (not shown in FIG. 2) can be carried on control loop 34 if used in multi drop mode.

Interface 54 also provides power to components of transmitter 22. The power is generated from current I flowing through loop 34. The power is supplied on the line identified PWR from interface 54 to the various components of transmitter 22. Because all the operating power for transmitter 22 is supplied by controller 56, it is critical that each of the circuits in transmitter 22 be optimized for reduced power consumption.

In accordance with the invention, microprocessor 58 couples to memory 50 and clock 52. Microprocessor 58 stores and retrieves information in and from memory 50. Clock 52 is used to maintain real time information and is therefore keeping time relative to some external timekeeping standard. Various clocks in the loop are synchronized with each other so that the clock of one transmitter has some predetermined relation to the clock of another transmitter. A technique for synchronizing clocks in a process control system is described in U.S. Pat. No. 4,939,753 entitled TIME SYNCHRONIZATION OF CONTROL NETWORKS.

In one of its basic forms, the invention provides a link between a stored variable which was obtained at a sample time and information related to the sample time. This provides many benefits. For example, information over a very short sampling period of time can be stored for later analysis. The analysis can be relatively slow in comparison to the short sampling period. The stored information can be used to perform a spectral analysis. Additionally, if real time information is used, the time information provides a link between a variable measured at one point in a process control system and a variable measured at another point. This link allows the control system to relate different variables to one another. Such a correlation can be used in diagnostics, for example.

In one embodiment, transmitter 22 includes two analog-to-digital converters 42 and 44. Analog-to-digital converter 42 provides a slower analog-to-digital conversion at a higher resolution than the speed and resolution provided by analog-to-digital converter 44. (In another embodiment, a single analog-to-digital converter is used with a variable conversion rate.) Microprocessor 48 transmits digitized process variables received from analog-to-digital converter 42 to controller 56 over loop 34 via interface 54. Additionally, microprocessor 48 receives (a clock output) from clock 52. This information relates to the real time on the network (i.e., the system shown in FIG. 1) when clock 52 is interrogated by microprocessor 48. Microprocessor 48 stores the clock information in memory 50. Digitized process variables from analog-to-digital converter 44 are received by microprocessor 48 and stored in memory 50. In one embodiment, this information can be stored at regular time intervals, for example, every 5 milliseconds. This process forms a table in memory 50 in which digitized process variables are stored and are associated with the time at which the process variable (PV) is digitized by analog-to-digital converter 44. (This may be accomplished by any suitable means. In one example, the sample time should be a time which can be compared relative to some other time.) Table 1 shows the resulting table formed in memory 50:

TABLE 1

| Location | Value | Data |
| --- | --- | --- |
| 000 | 000 | Time (Initial) |
| 001 | 215 | PV t = 0 |
| 002 | 225 | PV t = 1 |
| 003 | 240 | PV t = 2 |
| 004 | 255 | PV t = 3 |
| 005 | 255 | PV t = 4 |
| 006 | 255 | PV t = 5 |
| 007 | 175 | PV t = 6 |
| 008 | 120 | PV t = 7 |
| 009 | 090 | PV t = 8 |
| 010 | 040 | PV t = 9 |
| 011 | 030 | PV t = 10 |
| 012 | 024 | PV t = 11 |
| 013 | 017 | PV t = 12 |
| 014 | 013 | PV t = 13 |
| 015 | 011 | PV t = 14 |
| 016 | 011 | PV t = 15 |
| 017 | 011 | PV t = 16 |
| 018 | 011 | PV t = 17 |

As shown in Table 1, the first information stored in memory 50 at location 000 is the time received from clock 52. In the example, the initial time is 0. This corresponds to the time on the network and is synchronized with other field devices. Microprocessor 48 then proceeds to store digitized process variables in memory 50 at subsequent locations. Each subsequent location represents the next point in time, for example, every 5 milliseconds. Thus, it can be determined that the digitized process variable stored in location 011 was taken at the initial time plus 10 times the time increment of 5 milliseconds, (i.e., at the initial time plus 50 milliseconds). It is important that a memory such as CMOS EEPROM, be selected which reduces power consumption, since all operating power for transmitter 22 is supplied over the loop 34.

Figure 3:
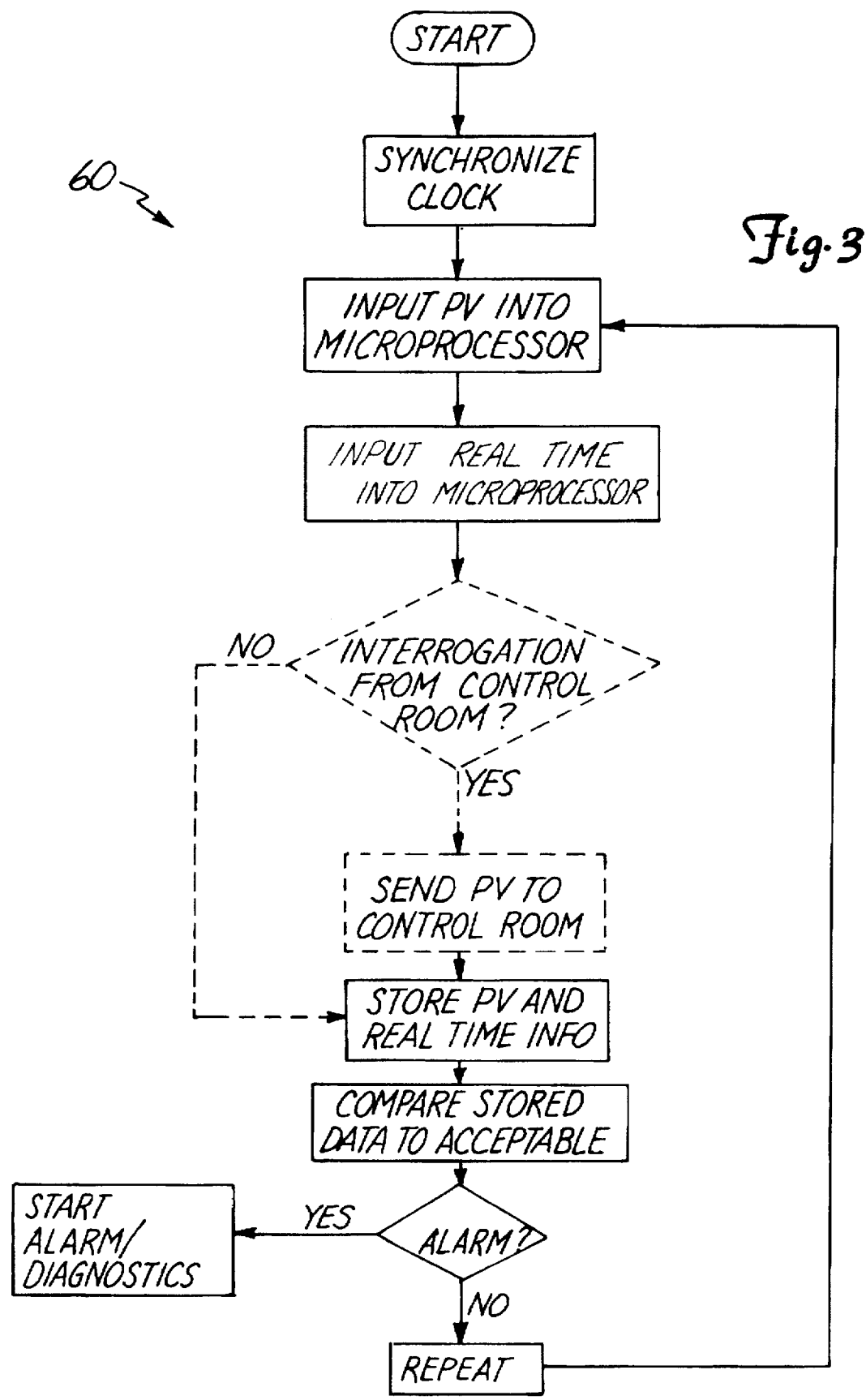
FIG. 3 is a flow chart of the operation of a microprocessor in the transmitter of FIG. 2.

FIG. 3 shows a simplified flow chart of operation of microprocessor 48. Microprocessor 48 is preferably implemented in CMOS to reduce power consumption. In a preferred embodiment, microprocessor 48 includes an on-chip EEPROM having a storage capacity of about 1K words of data. Microprocessor 48 synchronizes clock 52 with the clocks in other transmitters on loop 34. Microprocessor 48 receives a sensed PV and a real time clock output from clock 52 related to the time at which the PV is sensed. If an interrogation request is received by interface 54 from controller 56, microprocessor 48 is triggered to send a digitized process variable to controller 56 through interface 54. In one embodiment, the digitized process variable is digitized using analog-to-digital converter 42. Next, microprocessor 48 stores the digitized process variable and real time clock input information in memory 50 as discussed above and shown in Table 1. In one embodiment, microprocessor 48 compares information stored in memory 50 with a predetermined acceptable range of values. (Some separate examples are given below in more detail.) If the stored data falls outside of the acceptable range or the progression of data points (PVs) stored in the memory indicates an error, microprocessor 48 triggers an alarm condition. This alarm condition can initiate diagnostics and warn controller 56 that the process has varied outside of acceptable parameter limits. If there is no error, the process is repeated and microprocessor 48 receives a PV from analog-to-digital converter. Note that the various steps in the sequence shown in FIG. 3 is for purposes of illustration and other sequences are within the scope of the invention.

Figure 4:
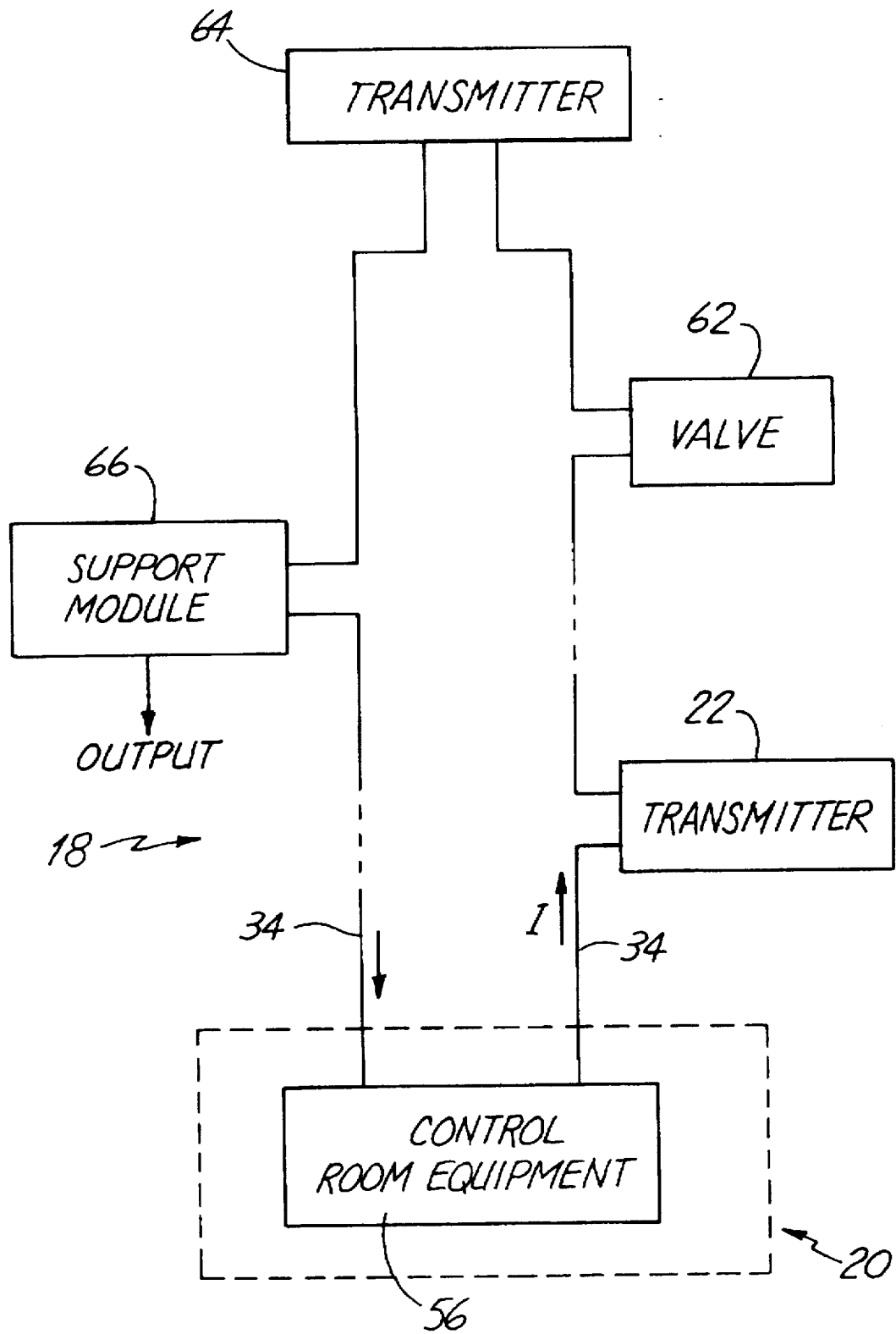
FIG. 4 shows a process control loop.

FIG. 4 is a diagram of a process control system 18 as shown in FIG. 1. FIG. 4 shows control room 20 containing control room equipment 56 coupled to transmitter 22 through loop 34. System 18 includes valve 62, transmitter 64 and support module 66. Transmitter 22, valve 62, and transmitter 64 may all include memory and clock circuitry similar to memory 50 and clock 52 shown in FIG. 2. In such an embodiment, valve 62 creates a table similar to Table 1 in which valve position is correlated with time information. Similarly, transmitter 64 can generate a table in its memory correlating the process variable it detects (for example, fluid level) with time information. Support module 66 is similar to transmitter 22 shown in FIG. 2 except that support module 66 does not include a sensor or analog-to-digital converters. Support module 66 includes a microprocessor, a memory, a clock and an interface. Support module 66 is capable of transmitting and receiving information over loop 34.

Figure 5:
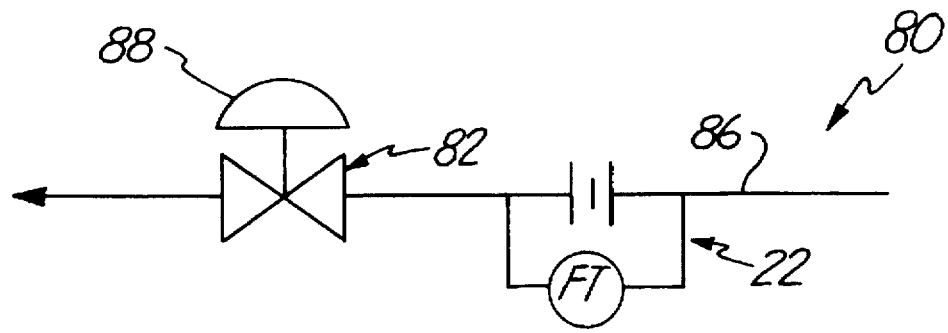
FIG. 5 is a schematic diagram of a process control system.
Figure 6:
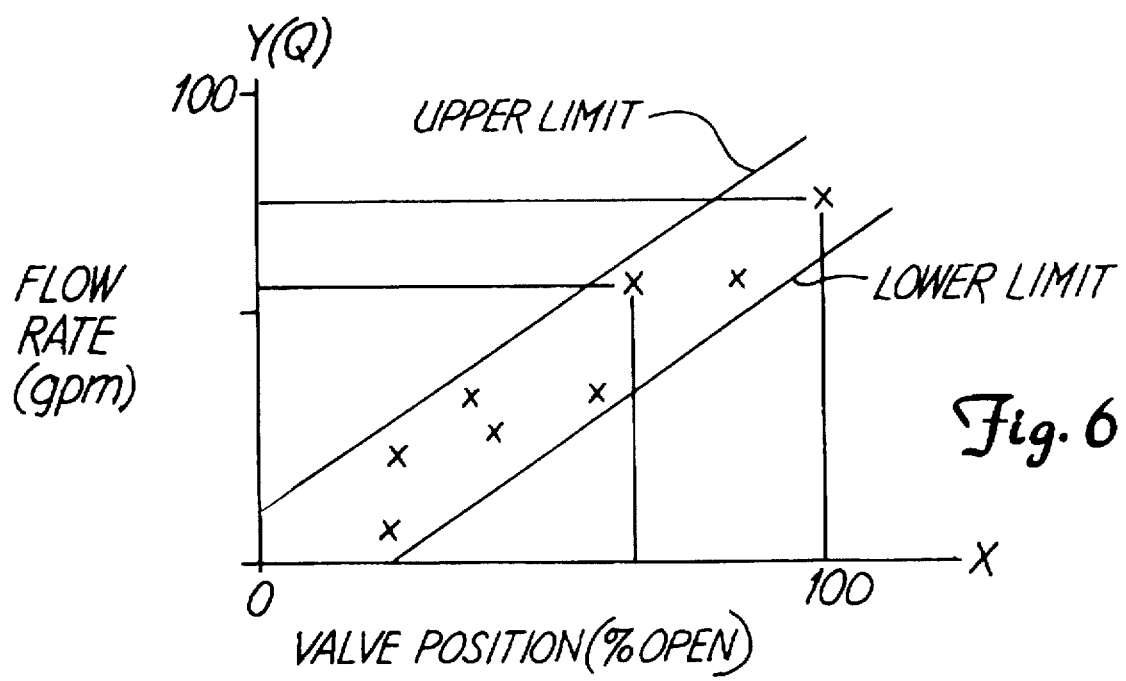
FIG. 6 is a graph of flow rate versus valve position for the process control system of FIG. 5.

FIG. 5 is a schematic diagram of a process control system 80 showing a valve 82 and a flow transmitter 22. The direction of process fluid flow is indicated by line 86. Valve 82 is a control valve coupled to a positioner 88. FIG. 6 shows a relationship between the valve characteristic of valve 82. The valve position on X axis is shown as a function of flow, Q in Y axis. Flow transmitter 22 receives information from control valve 82 representative of the valve position at a specific network time. Memory 50 in flow transmitter 22 contains information related to flow rate correlated with real (network) time. Circuitry in control valve 82 generates a table similar to Table 1 except that it contains valve positions and associated real time values. This information from control valve 82 is sent to flow transmitter 22 over loop 34 when control valve 82 is interrogated by flow transmitter 22. The real time values provide a link between a flow rate measurement by flow transmitter 22 and valve position provided by control valve 82. Based upon this information, microprocessor 48 in flow transmitter 22 can compare the flow rate/valve position correlation with an acceptable flow rate/valve position correlation and determine whether the process is functioning properly. If the correlation falls outside of the acceptable range, microprocessor 48 triggers an alarm and sends a warning signal to control room circuitry 56 over loop 34. Additionally, transmitter 22 can send instructions to valves and other field devices in response to the failure condition.

In one embodiment, valve 82 is a smart valve and includes a microprocessor, memory and clock similar to that shown in FIG. 2 for transmitter 22. In such an embodiment, the smart valve stores valve position. Valve position is a process variable related to the process being controlled.

Support module 66 shown in FIG. 4 is capable of developing a correlation similar to that shown in FIG. 6. Additionally, control room equipment 56 can interrogate various transmitters and field devices on loop 34 to send the contents of their memory over loop 34 so that equipment 56 can develop similar correlations. Note that since information is immediately digitized and stored in the device sensing the information, the interval between samples is capable of being much smaller than if the information is sent periodically over the control loop 34 at the normal system update rate. Hence, it is possible to obtain sufficiently fine resolution to generate a useful frequency analysis, such as through a fast Fourier transform of information stored in memory 50 or of a correlation between one measured process variable and another. The transform is performed by microprocessor 48 using standard FFT techniques. In such an embodiment, digital signal processing capabilities can be included in the microprocessor. Further, the processing of stored information can operate at a relatively slow rate, thus saving power, because the processing can look at information gathered during a short sampling period and then process the information over a much longer period.

Correlations in the present invention can be performed in both the time and the frequency domain. The correlations are compared against baseline operation to diagnose system operation.

One example correlation monitors flow rate. This information is used to detect a worn pump or a plugged input to a sensor impulse line connected to a differential pressure transmitter. Pump anomalies give rise to specific patterns when viewed in the frequency domain.

Using the FieldBus communication protocol, various devices in a control system can synchronize their clocks to the digital control system clock.

In another embodiment, the PV output on the control loop can be held constant while various diagnostic information is recorded to memory. This diagnostic information includes loop impedance, power supply characteristics (voltage, current and noise) or ground loop information. These off line diagnostics are then compared with acceptable values to diagnose operation of a transmitter. Stored information can be used to establish a baseline to detect anomalies during operation.

Although the preferred embodiment has been described with reference to a field transmitter, the invention applies to any type of field device. This includes transmitters, valve positioners, switches and discrete devices. Although the present invention has been described with reference to preferred embodiments, workers skilled in the art will recognize that changes may be made in form and detail without departing from the spirit and scope of the invention.

What is claimed is:

1. A transmitter in a two wire process control loop, comprising:

a sensor for sensing a process variable;

an analog-to-digital converter coupled to the sensor providing a digitized process variable at a sample time;

an interface coupling the transmitter to the two-wire control loop for communicating information and receiving power for the transmitter over the two wire control loop;

a clock having a first clock output;

memory for storing information;

control circuitry coupled to the memory and the first clock output for storing in the memory digitized process variables and the first clock output related to the sample time of the digitized process variables; and means coupled to the memory and to the interface for receiving a plurality of data points related to operation of a control system and a plurality of second clock outputs related to a sample time of each of the plurality of data points from another device coupled to the control loop, wherein the control circuitry develops a correlation between the plurality of stored digitized process variables and the plurality of received data points based upon the first and second clock outputs and provides an output related to the correlation.

2. The transmitter of claim 1 wherein:

the control circuitry actuates the interface to send information related to the digitized process variables over the process control loop, wherein there is a maximum update rate at which information is sent; and the control circuitry stores digitized process variables in memory at a storing rate which is greater than the maximum update rate.

3. The transmitter of claim 1 wherein the control circuitry actuates the interface to transmit a plurality of stored digitized process variables and the stored clock output over the process control loop.

4. The transmitter of claim 1 wherein information is erased from the memory and subsequent information is written to the memory.

5. The transmitter of claim 1 wherein the control circuitry performs a spectral analysis on information stored in memory.

6. The transmitter of claim 1 wherein the plurality of second clock outputs and the plurality of data points are received from the two-wire process control loop.

7. The transmitter of claim 1 wherein the means for receiving generates power for completely powering the transmitter using power received from the two-wire process control loop.

8. The transmitter of claim 1 wherein the output is a warning related to control loop operation.

9. The transmitter of claim 1 wherein the process variable is related to valve position of a control valve.

10. A field device for use in a two-wire process control loop of a control system coupled to a controller, the field device for monitoring a process variable related to a process and sending information related to the process variable to the controller, comprising:

means for determining a value of the process variable and providing a PV (process variable) output;

coupling circuitry coupling to the two-wire control loop for receiving power from the control loop to power the field device, and communicating information to the controller;

a field device clock providing a first clock output related to passage of time;

memory containing time data based upon the first clock output and a plurality of PV outputs obtained at a plurality of time intervals from the means for determining, the time data related to a sample time at which each PV output was obtained;

control circuitry for transmitting the PV output to the controller through the coupling circuitry and for storing the plurality of digitized process variables and time data in the memory; and means for receiving a plurality of data points related to operation of the control system and a plurality of second clock outputs related to a sample time of each of the plurality of second-data points from another field device coupled to the control loop; and wherein the control circuitry develops a correlation between the plurality of stored PV outputs and the plurality of received data points based upon the first and second clock outputs and provides an output related to the correlation.

11. The field device of claim 10 including means for transmitting the plurality PV outputs and time data stored in memory to the controller through the coupling circuitry over the control loop.

12. The field device of claim 10 wherein the output is a warning related to control loop operation.

13. The field device of claim 10 wherein the process variable is related to valve position of a control valve.

14. The field device of claim 10 wherein the means for receiving generates power for completely powering the transmitter using power received from the two-wire process control loop.

* * * * *